(12) United States Patent
Sethumadhavan et al.

(10) Patent No.: US 9,483,376 B2
(45) Date of Patent: *Nov. 1, 2016

(54) SYSTEM AND METHODS FOR PRECISE MICROPROCESSOR EVENT COUNTING

(71) Applicant: The Trustees of Columbia University in the City of New York, New York, NY (US)

(72) Inventors: Lakshminarasimhan Sethumadhavan, New York, NY (US); John Demme, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,367

(22) Filed: Sep. 5, 2014

(65) Prior Publication Data
US 2015/0046755 A1 Feb. 12, 2015

Related U.S. Application Data

(63) Continuation of application No. 13/273,035, filed on Oct. 13, 2011, now Pat. No. 8,855,970.

(60) Provisional application No. 61/392,880, filed on Oct. 13, 2010.

(51) Int. Cl.
*G06F 11/30* (2006.01)
*G06F 11/34* (2006.01)

(52) U.S. Cl.
CPC ....... *G06F 11/3409* (2013.01); *G06F 11/3024* (2013.01); *G06F 11/3466* (2013.01); *G06F 2201/815* (2013.01); *G06F 2201/88* (2013.01)

(58) Field of Classification Search
CPC .................................................. G06F 11/3024
USPC ........................................................ 702/182
See application file for complete search history.

(56) References Cited

U.S. PATENT DOCUMENTS 6,792,392 B1    9/2004   Knight
6,799,236 B1 *  9/2004   Dice ......................... G06F 9/52
                                                          710/200

(Continued)

OTHER PUBLICATIONS

Emer, J. S., & Clark, D. W. (Jan. 1984). A Characterization of Processor Performance in the VAX-11/780. ACM SIGARCH Computer Architecture News, 12(3), 301-310.

(Continued)

*Primary Examiner* — Bryan Bui
(74) *Attorney, Agent, or Firm* — Hunter Clark PLLC

(57) ABSTRACT

Method for providing precise microprocessor performance counter readings including detecting a swap back to a monitored process executing in a microprocessor. In response to the detected swap back to the monitored process, if the value read from the performance counter does not exceed the defined overflow threshold, the value of the performance counter stored in the first memory location is restored to the performance counter. If the value read from the performance counter exceeds the defined overflow threshold, the performance counter is set to zero and the value of the performance counter stored in the first memory location is used to increment an overflow memory location. If the value read from the performance counter exceeds the defined overflow threshold, at least one performance counter reading instruction is detected and in response to the detected at least one performance counter reading instruction, setting the counter output register to zero.

20 Claims, 13 Drawing Sheets

(56) References Cited

U.S. PATENT DOCUMENTS

| | | | |
|---|---|---|---|
| 8,855,970 B2* | 10/2014 | Sethumadhavan | G06F 11/3466 702/186 |
| 2002/0136066 A1 | 9/2002 | Huang | |
| 2007/0067556 A1 | 3/2007 | Dixon et al. | |
| 2008/0016260 A1 | 1/2008 | Pennock et al. | |

OTHER PUBLICATIONS

Bershad, B. N., Redell, D. D., & Ellis, J. R. (Sep. 1992). Fast mutual exclusion for uniprocessors. ACM Sigplan Notices, 27, 223-233.

Zagha, M., Larson, B., Turner, S., & Itzkowitz, M. (1996). Performance analysis using the MIPS R10000 performance counters. Proceedings of the 1996 ACM/IEEE Conference on Supercomputing. Article No. 16, 20 pgs. IEEE.

Anderson, J. M., Berc, L. M., Dean, J., Ghemawat, S., Henzinger, M. R., Leung, S. T. A., . . . Weihl, W. E. (1997). Continuous profiling: where have all the cycles gone?. ACM Transactions on Computer Systems (TOCS), 15 (4), 357-390. Retrieved from http://www-plan.cs.colorado.edu/diwan/7135/p357-anderson.pdf.

Dean, J., Hicks, J. E., Waldspurger, C. A., Weihl, W. E., & Chrysos, G. (Dec. 1997). ProfileMe: Hardware support for instruction-level profiling on out-of-order processors. Proceedings of the 30th Annual ACM/IEEE International Symposium on Microarchitecture, 292-302. IEEE Computer Society.

Keeton, K., Patterson, D. A., He, Y. Q., Raphael, R. C., & Baker, W. E. (1998). Performance characterization of a quad Pentium pro SMP using OLTP workloads. ACM SIGARCH Computer Architecture News, 26(3), 15-26. ACM.

Ailamaki, A., Dewitt, D. J., Hill, M. D., & Wood, D. A. (Sep. 1999). DBMSs on a Modern Processor: Where does time go? VLDB, 99, 266-277. Retrieved from http://www.vldb.org/conf/1999/P28.pdf.

May, J.M. (Apr. 2001). MPX: Software for multiplexing hardware performance counters in multithreaded programs. Proceedings of 15th International Parallel and Distributed Processing Symposium. 8 pgs. IEEE.

Moore, S. V. (2002). A comparison of counting and sampling modes of using performance monitoring hardware. ICCS 2002 Lecture Notes in Computer Science, 2330, 904-912. Springer Berlin Heidelberg.

Li, T., John, L. K., Sivasubramaniam, A., Vijaykrishnan, N., & Rubio, J. (Oct. 2002). Understanding and improving operating system effects in control flow prediction. ACM Sigplan Notices, 37(10), 68-80.

Bienia, C., Kumar, S., Singh, J. P., & Li, K. (Oct. 2008). The PARSEC Benchmark Suite: Characterization and Architectural Implications. Proceedings of the 17th International Conference on Parallel Architectures and Compilation Techniques, 72-81. ACM. Available at: http://parsec.cs.princeton.edu/publications/bienia08characterization.pdf.

Semiconductor Industry Association (SIA). (Dec. 18, 2008). The Critical Role of Semiconductors in Solving America's Challenges. Retrieved from http://sia-online.org/galleries/Publications/SIA%20Letter%20to%20Transition%20Team%20%20-%2008.12.18.pdf.

Intel 64 and IA-32 Architectures Software Developer's Manual. vols. 1, 2A, 2B, 3A & 3B. (Mar. 2010).

Eyerman, S., & Eeckhout, L. (Jun. 2010). Modeling critical sections in Amdahl's law and its implications for multicore design. ACM SIGARCH Computer Architecture News, 38(3), 362-370. ACM.

Cepeda, S. (Sep. 3, 2010). Intel parallel amplifier under the hood. Retrieved from http://software.intel.com/en-us/articles/parallel-amplifier-under-the-hood/.

Semiconductor Industry Association (SIA). (Oct. 4, 2010). Global Chip Sales Increase 1.8 Percent Month-on-Month. Global Sales Report. Retrieved from http://www.semiconductors.org/news/2010/10/04/global_sales_reports_2010/global_chip_sales_increase_1.8_percent_month_on_month/.

AMD64 technology lightweight profiling specification, revision 3.08, 2010. Retrieved from http://amd-dev.wpengine.netdna-cdn.com/wordpress/media/2012/10/437241.pdf.

Linux kernel 2.6.32, perf_event .h [source code]. Available from https://github.com/deater/perf_event_tests/blob/master/perf_event_h/perf_event.h-2.6.32.

Oprofile [source code]. Available from http://oprofile.sourceforge.net/.

Perfmon2 [source code]. Available from http://perfmon2.sourceforge.net/.

Rabbit, a performance counters library for Intel/AMD processors and Linux [source code]. Available from http://www.scl.ameslab.gov/Projects/Rabbit/.

Intel VTune Amplifier XE 2013 [software]. Available from https://software.intel.com/en-us/intel-vtune-amplifier-xe.

* cited by examiner

```
40 if (info->s->concurrent_insert)
41   rw_rdlock(&info->s->
                 key_root_lock[inx]);
```

```
42 changed=_mi_test_if_changed(info);
43 if (!flag) {
44   switch(info->s->
              keyinfo[inx].key_alg) {
   /* 37 lines omitted */
82 }
```
```
84 if (info->s->concurrent_insert) {
85   if (!error) {
86     while (...) {
         /* 10 lines omitted */
97     }
98   }
```
```
99   rw_unlock(&info->s->
                 key_root_lock[inx]);
100 }
```

☐ Conditional Locks

FIG. 4

(a) Cycles in Library Functions

(b) Last Level Cache Misses

(c) ICache Stalls (a) Locking and Lock Held Times (b) Lock Held Times (c) Static and Dynamic Locks

Table 1

| Time | PAPI-C | perf_event | LiMiT | Speedups | |
|---|---|---|---|---|---|
| User | 1.26s | 0.53s | 0.34s | 3.7x | 1.56x |
| Kernel | 30.10s | 7.30s | 0s | ∞ | ∞ |
| Wall | 31.44s | 7.87s | 0.34s | 92x | 23.1x |

Table1:Speedups of LiMiT, perf_event, and PAPI ($10^7$ reads of 3 counters) plus LiMiT's speedup over PAPI and perf_event respectively.

FIG. 12

Table 2

| | Firefox | Apache | PARSEC | MySQL |
|---|---|---|---|---|
| Average Lock Held Time | 789 | 149 | 118 | 1076 |
| Dynamic Locks per 10k Cycles | 3.24 | 1.12 | 0.545 | 3.18 |
| Static Locks per Thread per Application | 57 | 1 | 17 | 13853 |

FIG. 13

SYSTEM AND METHODS FOR PRECISE MICROPROCESSOR EVENT COUNTING

CROSS-REFERENCE TO RELATED APPLICATIONS

This application is a continuation application of, and claims priority to, U.S. patent application Ser. No. 13/273,035, entitled "SYSTEM AND METHODS FOR PRECISE MICROPROCESSOR EVENT COUNTING," and filed Oct. 13, 2011, which claims priority to, and the benefit of, U.S. Provisional Patent Application No. 61/392,880, filed on Oct. 13, 2010, the contents of all of which are hereby incorporated by reference in their entireties.

STATEMENT REGARDING FEDERALLY SPONSORED RESEARCH

This invention was made with government support under Grant No. FA 9550-09-1-0389 awarded by the Air Force Office of Scientific Research (AFOSR). The government has certain rights in the invention.

BACKGROUND

On-chip performance counters play a vital role in computer architecture research due to their ability to quickly provide insights into application behaviors that are time consuming to characterize with traditional methods. On-chip performance counters offer a convenient alternative to guide computer architecture researchers through the challenging, evolving application landscape. Performance counters measure microarchitectural events at native execution speed and can be used to identify bottlenecks in any real-world application. These bottlenecks can then be captured in microbenchmarks and used for detailed microarchitectural exploration through simulation.

The usefulness of modern performance counters, however, is limited by inefficient techniques used today to access them. Current access techniques rely on imprecise sampling or heavyweight kernel interaction forcing users to choose between precision or speed and thus restricting the use of performance counter hardware.

Recently, some hardware vendors have increased coverage, accuracy and documentation of performance counters making them more useful than before. For instance, about 400 events can be monitored on a modern Intel chip, representing a three-fold increase in a little over a decade. Despite these improvements, it is still difficult to realize the full potential of hardware counters, because the costly methods used to access these counters perturb program execution or trade overhead for loss in precision.

Conventional tools for accessing performance counters attempt to read performance counters via hardware interrupts or heavyweight kernel calls. An inherent downside of kernel calls is that they interrupt normal program execution and slow down the program thereby affecting the quantity being measured. To minimize these perturbations, most profilers resort to occasionally reading these counters and extrapolating full program statistics from the sampled measurements. While this extrapolation is necessarily imprecise, the error introduced by the process has been acceptable when profiling hotspots in serial programs.

Traditional sampling, however, has fundamental incompatibilities for parallel programs which have become commonplace with the availability of multi-cores. Traditional sampling methods are likely to miss small critical sections because they do not constitute the hottest regions of the code. Amdahl's law, however, provides that optimizing critical sections is necessary to ensure scalability, even if the time spent in critical sections is relatively low. Moreover, irrespective of the size, it is not easy to correctly monitor critical sections. Performance characterization of parallel programs with performance counters calls for simple, lightweight access methods that can enable precise performance measurement for both hot and cold code regions.

A common feature of many of the counter designs in early processors—and a source of major frustration to date—is that all of these counters were accessible only in the privileged mode, thus requiring a high overhead kernel call for access. This problem was mitigated to an extent in the MIPS R10000, which included support for both user-level and kernel-level access to the performance counters. Later x86 machines from Intel and AMD have included similar configurable support. However, the software used to access the counters (kernel and libraries) often do not enable user space counter reads by default, likely to allow them to mask the complexity of counter virtualization behind the kernel interface.

Hand in hand with the hardware improvements, many software tools have been developed over the years to obtain information from performance counters. These tools can either pull data from the performance counters on demand at predetermined points in the program or operate upon data pushed by the performance counter during externally-triggered sampling interrupts. An open source example is the Performance API (PAPI) which was created in 1999 to provide an standard interface to performance counters on different machines. With these conventional tools, users can extrapolate measurements obtained from samples collected either at predetermined points in the program or during sampling interrupts triggered by user specified conditions e.g., N cache misses. A general drawback to these sampling methods is that it introduces error inversely proportional to the sampling frequency. As a result, short or cold regions of interest are difficult to measure precisely.

Conventional performance monitoring tools require that the performance counters be read by the kernel, requiring heavyweight system calls to obtain precise measurements. Unlike these conventional tools, the access techniques described herein provide both precise and low overhead measurements by allowing userspace counter access. We compare the measurements to conventional techniques PAPI-C and perf_event in the discussion below and show that by enabling userspace access, the disclosed embodiments introduce less perturbation than PAPI, and decreased overheads enable accurate, precise profiling of long running or interactive production applications.

SUMMARY

We describe herein new methods that enable precise, lightweight interfacing to on-chip performance counters. These low-overhead techniques allow precise reading of virtualized counters in low tens of nanoseconds, which is one to two orders of magnitude faster than current access techniques. Further, these tools provide several fresh insights on the behavior of modern parallel programs such as MySQL and Firefox, which were previously obscured (or impossible to obtain) by existing methods for characterization. Based on case studies with new access methods, we discuss seven implications for computer architects in the cloud era and three methods for enhancing hardware counters further. Taken together, these observations have the potential to open up new avenues for architecture research.

The precise access method, embodied in an x86-Linux tool, referred to herein as "Lightweight Microarchitectural Toolkit (LiMiT)," requires less than 12 ns per access and is over 90× faster than PAPI-C and 23× faster than Linux's perf-event, tools that provides similar functionality. LiMiT is a patch for the Linux kernel and userland library which enables direct userspace access to Intel's hardware performance counters for lightweight, precise performance measurements.

In one aspect, the disclosed embodiments provide a method and a corresponding system and software for performing precise microprocessor performance counter readings. The method includes detecting a swap of a monitored process being executed by the microprocessor. The method further includes reading, if the swap of the monitored process is detected, a value of a performance counter, wherein the value of the performance counter is output to a counter output register. The value of the performance counter is stored in a first memory location. The method further includes determining whether the value of the performance counter exceeds a defined overflow threshold and detecting a swap back to the monitored process. In response to the detected swap back to the monitored process, the method includes the following steps. If the value read from the performance counter does not exceed the defined overflow threshold, the value of the performance counter stored in the first memory location is restored to the performance counter. If the value read from the performance counter exceeds the defined overflow threshold, the performance counter is set to zero and the value of the performance counter stored in the first memory location is used to increment an overflow memory location. Also, if the value read from the performance counter exceeds the defined overflow threshold, the method includes detecting at least one performance counter reading instruction executed by the monitored process and in response to the detected at least one performance counter reading instruction, setting the counter output register to zero.

In one aspect, the disclosed embodiments provide a method and a microprocessor for executing destructive performance counter reads. The method includes loading in an instruction pointer register of the microprocessor a value indicating a destructive performance counter read instruction. The method further includes reading a parameter from a first register (ecx) to select a performance counter to read for the destructive performance counter read instruction and reading a value of the selected performance counter indicated by the parameter read from the first register (ecx). The method further includes loading the value read from the selected performance counter into at least a second register (eax:edx) and setting the selected performance counter to zero.

BRIEF DESCRIPTION OF THE DRAWINGS

The above and other objects and advantages of the disclosed subject matter will be apparent upon consideration of the following detailed description, taken in conjunction with accompanying drawings, in which like reference characters refer to like parts throughout, and in which:

FIG. 4 shows a code excerpt from MySQL.

FIG. 12 is a table (marked as Table 1) providing LiMiT speedup data.

FIG. 13 is a table (marked as Table 2) providing locking-related average data.

DETAILED DESCRIPTION

Figure 1:
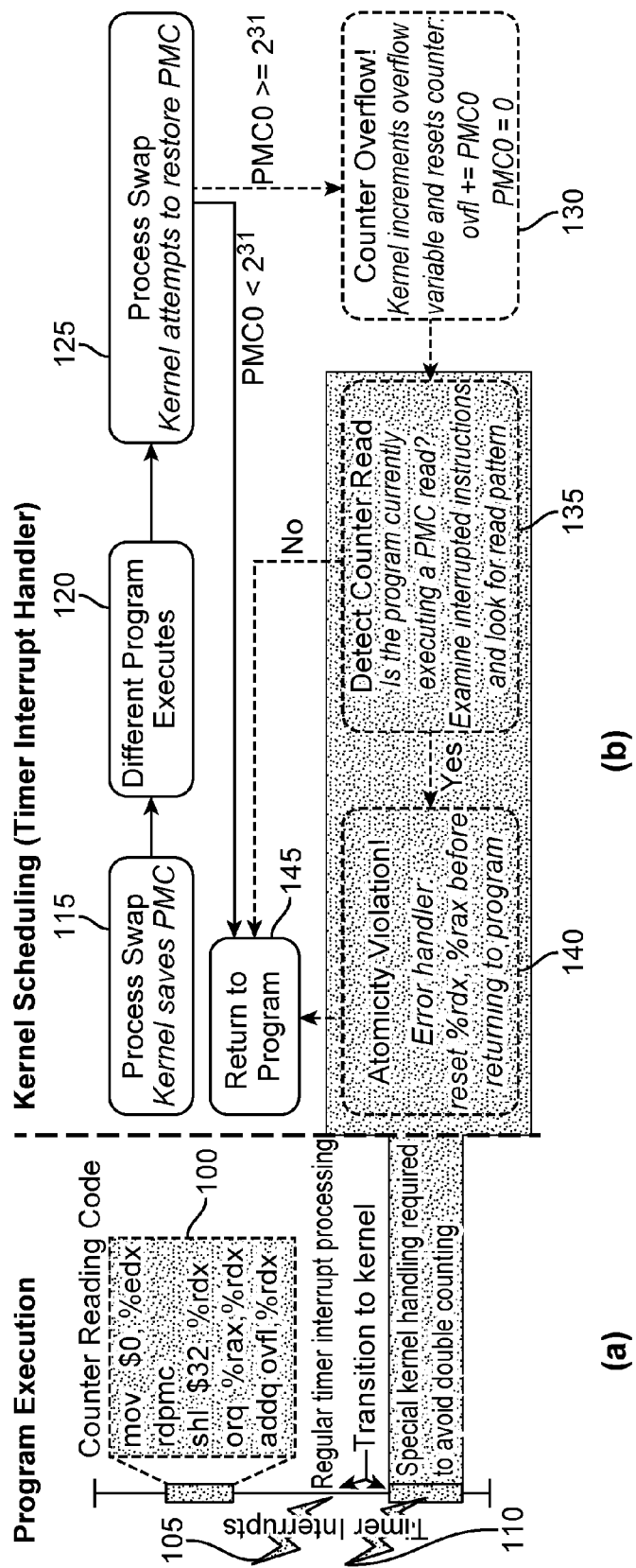
FIG. 1(a) shows a five-instruction counter read sequence (dotted box) embedded as part of a monitored program execution.
FIG. 1(b) shows modifications (depicted as highlighted boxes) that provide detection of interrupted counter reads and fixes for double counting errors.

The performance of a user application may be monitored by periodically reading a performance counter of the microprocessor while the application is being executed. Such counter readings may be analyzed to determine, for example, which specific sections of the program code may be acting as bottlenecks that slow the execution of the entire application. The performance counter of a microprocessor is a sequential counter which is incremented as each microarchitectural "event" occurs in the microprocessor, e.g., the execution of an operation or instruction. The reading of the performance counter may be done by code sections which are inserted into the application itself at determined locations, e.g., before and after sections of the program code deemed to be "critical".

As discussed above, the key to performing low-overhead performance counter reads is to avoid making kernel calls (i.e., system calls) by allowing user applications to directly read the performance counters. As we discuss below in further detail, the direct reading of the performance counter may be done using a method which includes: (1) setting up the performance counter for direct access by user applications; (2) inserting code to perform the reading of the performance counter at determined locations in the program code to be monitored; (3) handling counter overflow conditions; and (4) handling situations in which an interrupt occurs while the performance counter is being read. We also compare the overheads of the performance counter access method to conventional methods.

Before a user application can directly access the performance counter, it may be necessary to take steps to enable the access. Enabling access by user applications, i.e., userspace access, to the performance counters may involve the following:

1. Stock Linux kernels do not allow direct user space access to performance counters. As a simple first step, we set the configuration bit (an MSR in x86) to allow user access.

2. Performance counters cannot be directly configured to monitor events of interest (e.g., instructions retired) from userspace. We add a system call to the Linux kernel to configure the counters. Since most applications are likely to set up these counters once or few times per program we do not take any special measures to optimize this step.

3. Enable process isolation by "virtualizing" the operation of the performance counter hardware, allowing multiple programs to use one hardware instance of the performance counters. The virtualization involves swapping and storing counter values as each different context is being executed by the processor. Without this support, programs would read events which occurred while other programs were executing, resulting in incorrect results and also opening up side-channels that can be used to infer information about program execution.

In theory, virtualization support should be as simple saving and restoring the performance counters during context swaps just like any other register. However, we need to deal with the possibility of performance counters overflowing. For example, Intel 48-bit counters can overflow every 26 hours, so overflows are likely for long running applications. Additionally, Intel chips prior to the "Sandy Bridge" chip configuration allowed only 32-bit write operations to the counters, so after only 1.4 seconds the kernel may find itself unable to correctly restore the counter when a process is swapped back in. The techniques for addressing overflow problems are discussed below.

Once direct access to the performance counter is enabled in the manner discussed above, it will be possible for the user application to read performance counter as it is executed. The direct reading of the performance counter is done by inserting code to perform the reading at determined locations in the program code to be monitored. Also, the kernel (i.e., the kernel patched according the disclosed embodiments) executes special processes to handle counter overflow and interrupts which occur during counter reads.

FIG. 1 presents a performance counter read sequence 100 (see dotted box on left-hand side of figure) embedded as part of regular program execution. As shown, program execution can be interrupted when the program is executing uninstrumented code (see 105) or when executing userspace code for reading counters (see 110). Interrupts 110 received during the direct counter reads require special handling to avoid "double-counting" errors, as discussed in further detail below. The right-hand side of FIG. 1 depicts a process for handling interrupts, including special modifications (see highlighted boxes) which provide detection of interrupted counter reads and fixes for double-counting errors. This process is also depicted in a more detailed manner in FIG. 2.

The following is an example of a sequence of assembly language instructions 100 which can be used to read the performance counter:

| | |
|---|---|
| mov $0, % ecx | (instruct subsequent rdpmc instruction to read counter number 0) |

-continued

| | |
|---|---|
| rdpmc | (read performance monitoring counter; reads 48-bit register into two 32-bit registers, eax and edx which are aliases for the lower 32-bits of the 64-bit rax and rdx registers) |
| shl $32, % rdx | (shift register rdx by 32 bits to the left to make room for the value in the register eax, a.k.a. rax) |
| orq % rax, % rdx | (OR operation to combine the two registers, rax and rdx; result is 48 bits of counter) |
| addq ovfl, % rdx | (reads overflow value from memory location ovfl which is controlled by kernel; must add this counter reading to get actual value of counter) |

Thus, when a process seeks to read the performance counter it must get the current value via rdpmc and then fetch and add the contents of the overflow value in memory. However, this set of instructions must be executed atomically, i.e., without interruption. If an interrupt and overflow occurs during the processing of the counter reading instructions (e.g., before the memory fetch but after the rdpmc), then the value read will have an error equal to the previous value of the counter. This occurs because, in this example, the kernel has zeroed the already-read counter register and incremented the as-yet-unread overflow variable (ovfl) at the time of the interrupt.

Figure 2:
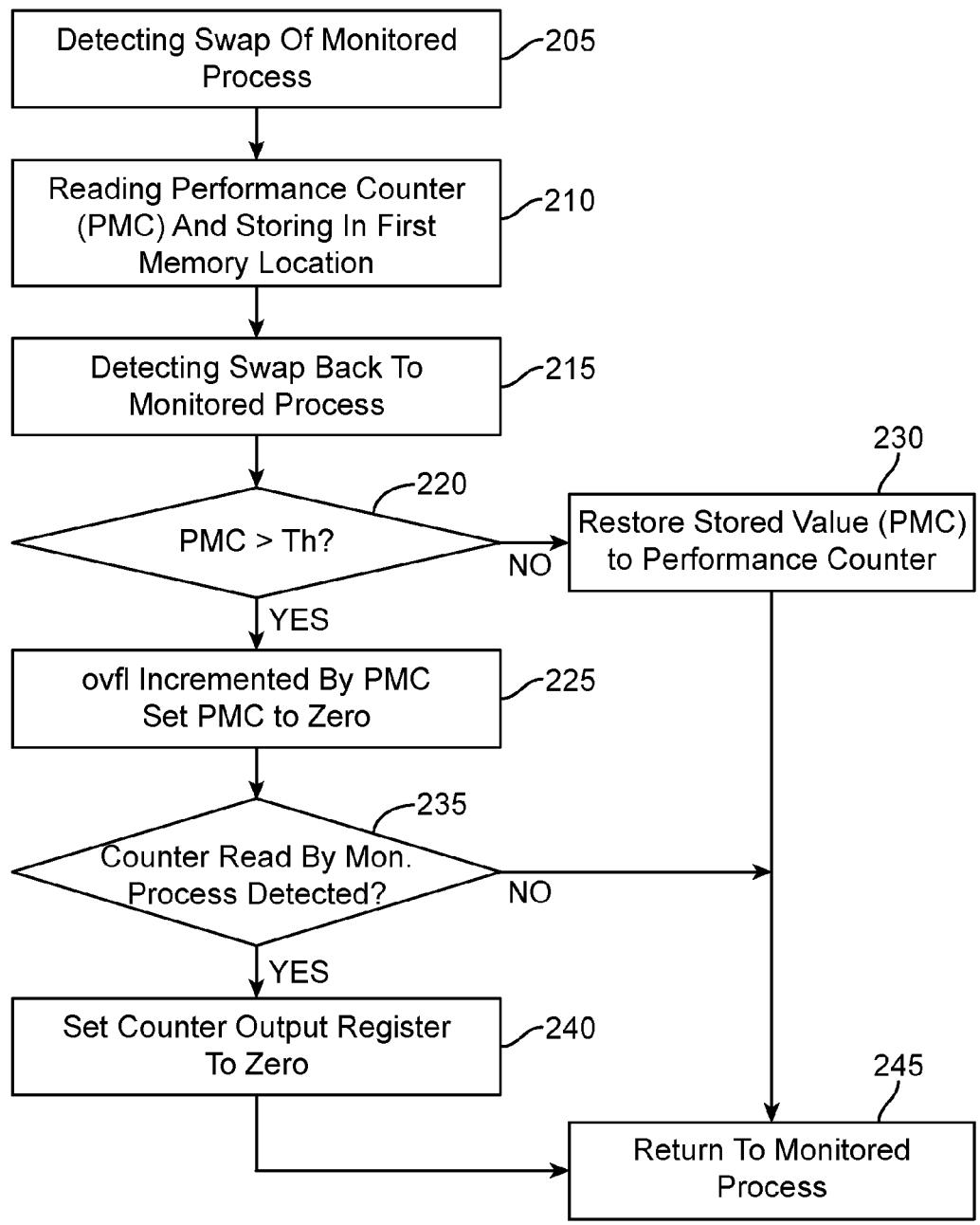
FIG. 2 is a more detailed diagram depicting the process shown in FIG. 1(b) for handling interrupts, detecting interrupted counter reads, and adjusting for double-counting errors.

As shown in FIGS. 1 and 2, one common cause of interrupts is a process swap, which occurs when another program (i.e., a program other than the user application being monitored) gets scheduled in for execution by the processor, e.g., for 10-20 ms. When the patched kernel detects that a swap is to occur 115, 205, the kernel reads counter and saves it 210. The other program is then executed for some period of time 120, after which time the original program is swapped back into the processor 125, 215. When the user application is swapped back 125, 215, then the kernel attempts to restore the counter to its original value. In this manner, the kernel can ensure that the performance counter is not affected by the execution of other programs.

An overflow problem 130 can arise in certain types of hardware. For example, in certain Intel processors, the counter is 48 bits, but the hardware only allows restoring of 31 bits to the counter. Therefore, if it is determined (see 220) that the value of the counter is greater than a threshold, e.g., $2^{31}$, then the kernel must (see 130, 225) restore a value of zero to the counter and store the actual counter value in the ovfl memory location (which is a 64-bit memory location). If, on the other hand, the counter value to be restored is less than $2^{31}$, then the value can be restored directly to the counter when the user application is swapped back into execution 230.

In the event of an overflow condition, the kernel must also check to see if the swap interrupt occurred while the user application was attempted to read the performance counter (see 135, 235). In other words, the kernel must determine whether the user application was executing the specific set of instructions to read the performance counter when the interrupt occurred. As noted above, these instructions must be executed atomically in order to perform a counter read without producing overflow handling errors, e.g., double-counting errors, as described below.

The condition in which an interrupt occurs during an attempted counter read can be detected, for example, by reading the instruction pointer (i.e., the instruction register) to detect execution of the performance counter read sequence, which, in this example, is a five-instruction sequence. If a counter read is detected, then an "atomicity violation" is indicated, i.e., the interrupt occurred while a counter read was being attempted.

If an interrupt, e.g., due to a program swap, occurs just before the counter is read by the user application, then no error arises, because the counter would read zero (because it is zeroed by the kernel when the swap occurs) and the overflow memory location (ovfl) would contain the correct overflow value. Therefore, adding the register value and the overflow memory location value results in the correct counter reading.

However, if an interrupt occurs after the counter is read by the user application, then the user application may read the same value both from the counter and the overflow memory location (ovfl) and then add these two values together. This would result in a counter reading which is twice the actual counter value, i.e., a double-counting error. This situation must be corrected by the error handling routine.

Therefore, in the event that an atomicity violation is detected, the error handling routine zeros out the registers storing the counter value 140, 240, i.e., registers rdx and rax, before returning to execution of the user application, instead of restoring the original values read from these registers at the beginning of the program swap. The user application will then read the zeroed registers rdx and rax (which will match the zeroed performance counter) and add them to the value stored in the overflow memory location (ovfl), which result in a correct counter reading. If there no atomicity violation is detected, then there is a return to the monitored process 145, 245 without zeroing the counter output registers.

As explained above, we work around overflows by detecting overflow conditions and accumulating the overflowed values in user memory. When a process wants to read a performance counter it must get the current value via rdpmc then fetch and add the contents of the overflow value in memory. However, as discussed above, this set of instructions must be executed atomically, i.e., without interruption.

Destructive Performance Counter Reads

When characterizing code segments using performance counter reading, a difference in counts between two points in the program is often required. A destructive read instruction—one that zeros the counter after reading it—could eliminate the currently necessary subtraction in many cases when counters are used. A microprocessor that implements a destructive performance counter read instruction could therefore greatly improve the efficiency of program monitoring.

A microprocessor could be designed to perform destructive performance counter reads by making certain modifications to the conventional instruction set. These modifications would include adding a destructive performance counter read command, which could be designated as "rdpmcd." Assuming that the destructive performance counter read is operating on a 48-bit performance counter and the reading is output into 32-bit registers (as discussed above with the conventional, non-destructive read command "rdpmc"), the processor would execute the destructive performance counter read in the following manner
  a) the microprocessor's instruction pointer register points to destructive read instruction;
  b) the microprocessor reads the ecx register to determine which performance counter to read and zero;
  c) the microprocessor reads the contents of selected performance counter register and loads the lower 32 bits into the eax register and the upper 16 bits into the edx register; and
  d) the microprocessor sets the selected performance register to zero.

Figure 3:
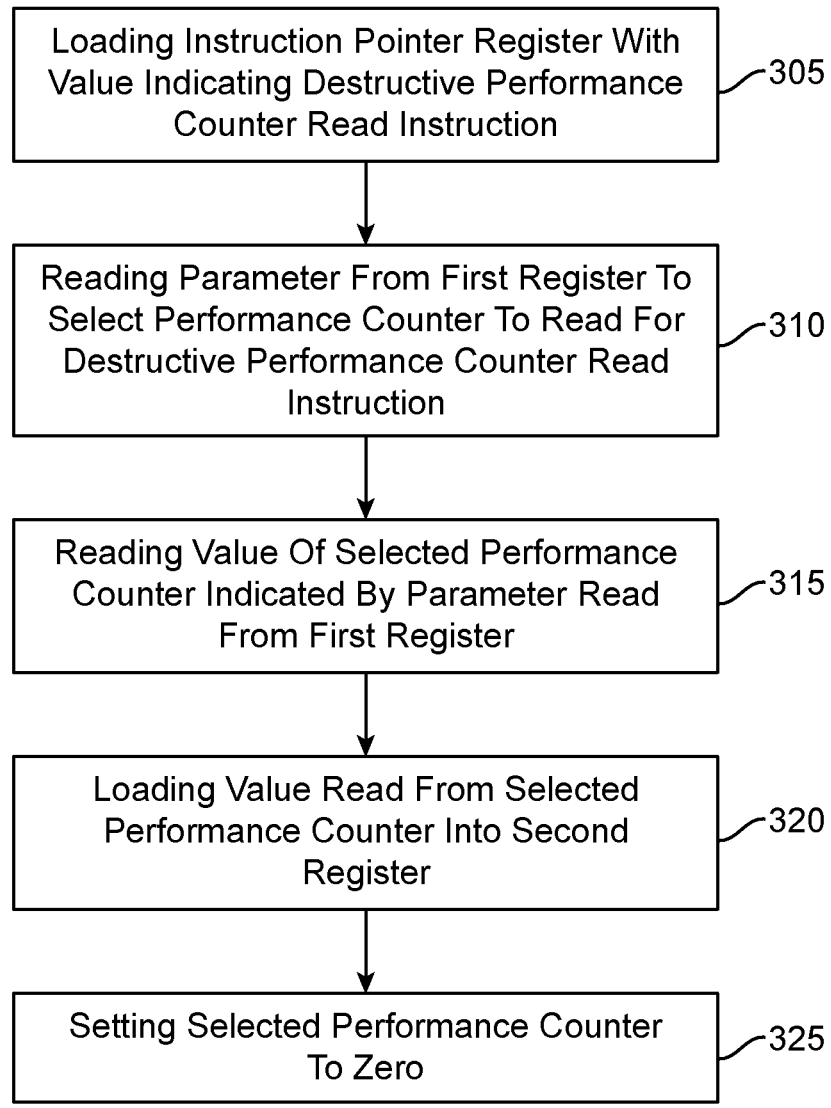
FIG. 3 depicts a method for executing destructive performance counter reads in a microprocessor.

A more general embodiment of this process is depicted in FIG. 3, which shows steps of: loading instruction pointer register with value indicating destructive performance counter read instruction 305; reading parameter from first register to select performance counter to read for destructive performance counter read instruction 310; reading value of selected performance counter indicated by parameter read from first register 315; loading value read from selected performance counter into second register 320; and setting selected performance counter to zero 325.

The following is an example of a sequence of assembly language instructions which can be used to read the performance counter using a destructive read command, which requires an additional step of zeroing the overflow memory location:

| | |
|---|---|
| mov $0, % ecx | (instruct subsequent rdpmcd instruction to read counter number 0) |
| rdpmcd | (destructive read performance monitoring counter; reads 48-bit register into two 32-bit registers, eax and edx which are aliases for the lower 32-bits of the 64-bit rax and rdx registers; counter is zeroed) |
| shl $32, % rdx | (shift register rdx by 32 bits to the left to make room for the value in the register eax, a.k.a. rax) |
| orq % rax, % rdx | (OR operation to combine the two registers, rax and rdx; result is 48 bits of counter) |
| addq ovfl, % rdx | (reads overflow value from memory location ovfl which is controlled by kernel; must add this counter reading to get actual value of counter) |
| mov $0, ovfl | (zeros overflow memory location ovfl; the destructive read zeros the counter and the overflow is semantically an extension to the counter. Therefore when rdpmcd zeros the counter, the overflow must also be zeroed otherwise it would no longer properly correspond to the counter) |

As with the non-destructive read, the kernel must handle process swaps and counter overflow conditions caused by the limitations of the register sizes and the bit limit on restoring the counter. For the destructive counter read, this process would be the same as described above and as shown in FIG. 1.

Preserving Atomicity

Two solutions to ensure atomic execution, turning off interrupts or protecting the critical section with a lock, cannot work in this context. If we disable interrupts, the executing process would never be swapped out and could starve other applications; allowing a user process to disable external interruption is dangerous. Locking is even more problematic. The algorithm requires the kernel to update the user space memory location that keeps track of the performance counter values. To do this the kernel must obtain a lock when the process is being swapped back in. However, if the process holds the lock, then the kernel cannot continue and the process will never resume to release the lock. In this situation deadlock is guaranteed.

Linux kernel interfaces such as Perfmon2 and perf_event deal with this problem by placing all sensitive code in the kernel where techniques like disabling interrupts can operate normally. By doing so, however, they add significant overhead to counter reads in the form of system calls to access counters.

To solve this problem, we use the approach depicted in FIGS. 1 and 2, as discussed above. We speculatively assume that there will be no atomicity violation, but build detection and error handling into the kernel code for cases where such events happen. With this approach, there is no additional overhead added to counter reading code in user space and overhead is only incurred on relatively infrequent counter overflows. To detect whether or not an application is in the middle of a counter read during a counter overflow we simply check the pattern of instructions before the process was interrupted (pointed to by the process' instruction pointer). If a counter read is detected, the kernel zeros the process' registers (% rax and % rdx in the x86 example) to match the new (overflowed) contents of the performance counter. Once resumed, the program will behave as if the interrupt, context switch and overflow had occurred immediately prior to the read of the performance counter.

LiMiT uses both kernel and userspace support. Due to the kernel modifications necessary in the context swapping subsection, LiMiT is partially implemented as a kernel patch. This patch adds support to the Linux kernel for the context swapping and atomicity violation detection/correction features used by the LiMiT access method. The kernel patch also adds several kernel calls to configure monitoring. LiMiT also includes a userspace library which serves as an interface to the kernel. The library includes functions to configure and read the performance counters.

LiMiT has several usage modes, including a C API. In this mode, one includes limit.h in the source code and links against the LiMiT library. The API provides a set of functions to set up/close hardware performance counters as well as read them. Routines for reading are implemented in-line to decrease latency to 5 instructions.

Usage Example: Measurement of branch mis-prediction during a function call:

```
// Compile with: gcc -O3 -o hello hello.c -llimit -ldl
#include <limit.h>
#include <stdint.h>
#include <stdio.h>
#define str1 "Hello World, Hello World, Hello World"
#define str2
"HELLOWORLDHELLOWORLDHELLOWORLDHELLOWO"
const char* testStr = str1;                //Also try str2
uint64_t uppersFound = 0, lowersFound = 0;
void function_to_watch(void) {
    size_t i;
    const char* c = testStr;
    while (*c != 0) {
        if (isupper(*c))
            uppersFound++;
        else if (islower(*c))
            lowersFound++;
        c++;
    }
}
int main(void) {
    uint64_t br_last, brm_last, c, br, brm;
    size_t i;
    lprof_init(3, EV_CYCLES, EV_BRANCH,
    EV_BRANCH_MISS);
    for (i=1; i<=30; i++) {
        lprof(2, br_last);           //Optional:
        lprof(3, brm_last);          // sample just before call
        function_to_watch( );        // Do something
        lprof(1, c);                 //Get cumulative
                                       cycles
        lprofd(2, br, br_last);              //Get delta
                                               branches
        lprofd(3, brm,               //Get delta mispreds
        brm_last);
        printf("At Cycle: %7lu, Br Misprediction: %lf\n", c,
    100.0*((double)brm)/br);
    }
    lprof_close( );
}
```

Comparison to Sampling

Sampling is typically used in two ways: interrupt based or by polling. In interrupt based sampling, interrupts are triggered when a predetermined event such as number of committed instructions reaches a predetermined count. These interrupts are received by the OS and passed on to the application. In polling based sampling, the counters are precisely read out once out of every N times a code region is executed to reduce overhead. While both approaches can have low overheads, there are a number of situations in which neither approach works well.

For example, FIG. 4 contains a critical section from MySQL which accounts for 30% of MySQL's overall critical section time. Let us say that we are interested in measuring time spent in critical sections using interrupt based sampling. If K of the N samples were in critical section we would extrapolate that K/N of the total time was spent in critical sections. However, there are several complications with this approach. In the above example, a sampling interrupt routine which fires during the critical section, would have difficultly determining whether or not a lock is held because the locks are executed based on the if conditional preceding the lock.

An alternative to interrupt sampling is to use precise access methods intermittently. In this case, explicit performance counter reads would have be used every time a lock is acquired or released. To reduce overhead, performance counter reads could execute only once out of every N times the region is entered, and the total time could be extrapolated from this measurement. While this method is effective in reducing overall overhead, the overheads for each precise read remain high. As a result, large perturbation is introduced immediately before and after the region of interest when measurement is actually occurring. We would therefore expect measurements for small regions to be inflated. We observe this effect during Case Study A in FIG. 6(b).

In many of these situations in which sampling or heavyweight precision present difficulties, ad hoc solutions are possible. However as the case studies demonstrate, a low overhead, precise measurement like LiMiT is sometimes the right tool for the job.

Comparison to PAPI and perf_event

For years, PAPI has been the standard library to write cross platform performance monitoring tools. As a library, it relies on kernel interface support; traditionally it has used perfmon2 on Linux. In contrast, perf_event is the newest Linux kernel interface. It is touted to be faster and more featureful than perfmon2 and will thus eventually replace it. However, due to its relative youth, library support for perf_event remains poor, placing a burden on the user but yielding better speeds as there is no library overhead.

Any performance counter readout call (be it PAPI or LiMiT) will cost some number of cycles. To examine this overhead, we construct a short benchmark which reads a counter configured to count three events (cycles, branches and branch misses) $10^7$ times each. With this high number of iterations, we can report the wall time for comparison of the overheads and compute the cost of each readout call. The results are presented in Table 1, provided in FIG. 12, which shows speedups of LiMiT, perf event, and PAPI ($10^7$ reads of 3 counters) plus LiMiT's speedup over PAPI and perf event respectively. On the Xeon 5550-based system, the average for LiMiT's five instruction readout code is 37.14 cycles. Since LiMiT does not require a system call for each sample, it is substantially faster compared to PAPI-C (by 92×) and perf_event (by 23×).

Below, we instrument MySQL to examine locking, unlocking and critical section timing (setup described in detail below). FIG. 6(b) shows that using LiMiT incurs a 42% cycle increase over uninstrumented execution. When the same instrumentation is performed using PAPI, a 745% user space cycle overhead is introduced and 97% is incurred with perf_event. Both PAPI's and perLevent's actual overheads, however, are much larger since over 90% of their overheads occur in kernel space (as shown in Table 1) but are not counted in FIG. 6(b). As a result, we would expect both PAPI and perLevent instrumentation to perturb execution more than LiMiT making the results virtually unusable.

Overheads also directly affects usability. We attempted to instrument and measure modern cloud workloads such as Firefox, MySQL and Apache with both LiMiT and PAPI. Firefox was unresponsive to input with PAPI, while it operated with no discernible slowdown when instrumented with LiMiT. We also measured that Apache served 9,246 requests per second with LiMiT instrumentation and 9,276 requests per second without instrumentation. These minor changes in speed demonstrate LiMiT's low overhead.

Comparison to RDTSC Measurements

Using rdtsc, the read time stamp counter instruction on x86 architectures, is de rigeur in userspace lightweight measurement. The time stamp counter is a free running counter present on all x86 machines. It simply counts bus cycles (uncore cycles for modern Intel processors) and most operating systems allow programs direct access to it. Since rdtsc is simple and lightweight, programmers will often use it to measure the time spent in short or long regions of code or to judge the effect of code changes on performance. LiMiT, however, offers capabilities that are superior to plain rdtsc: aside from offering a variety of countable events besides bus cycles, LiMiT provides process isolation which allows each process to shield its measurements from other processes' direct interference. While one could apply many of LiMiT's techniques to rdtsc, this does not occur in practice so we compare against rdtsc without any such additions.

Figure 5:
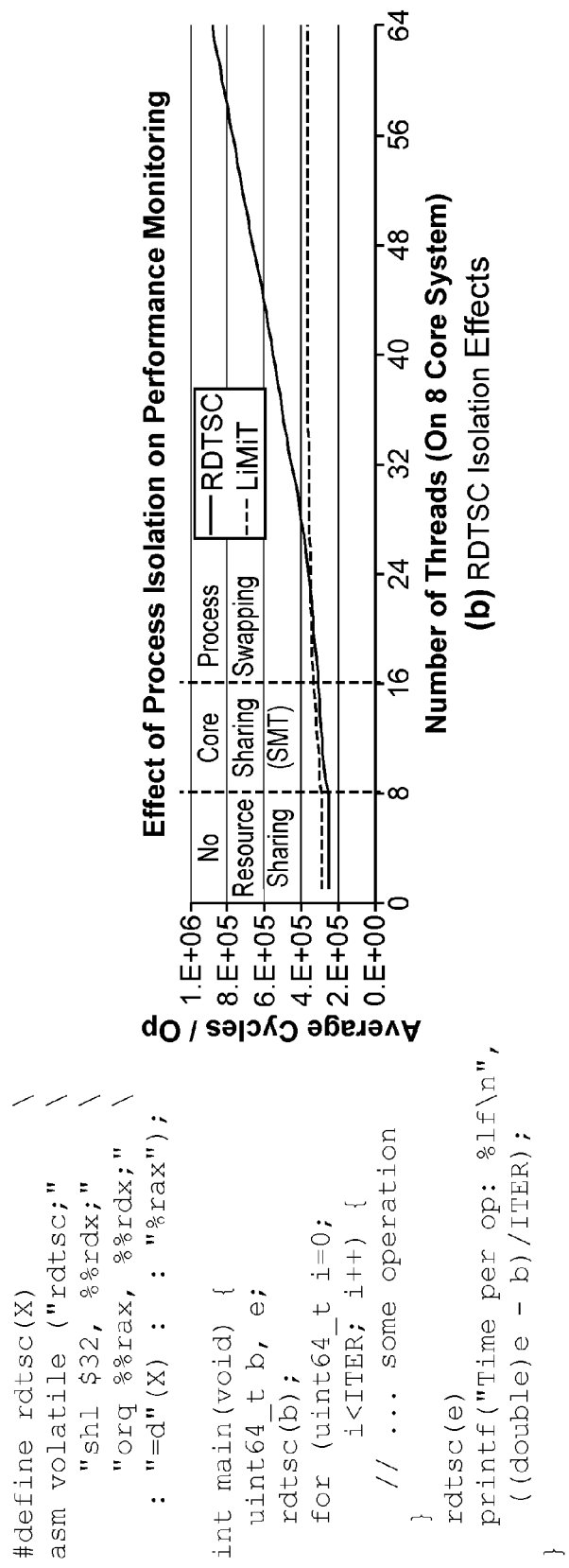
FIG. 5(a) shows a typical usage example for a read time stamp counter (rdtsc) instruction on x86 architectures.
FIG. 5(b) shows the effects of process isolation in LiMiT, which helps prevent other threads and processes from directly affecting event counts.

To examine the effect of process isolation, we construct a simple microbenchmark which executes non-memory operations across multiple threads on an 8 core system, allowing the operating system to schedule them onto cores. FIG. 5(a) shows a typical rdtsc usage example, and FIG. 5(b) shows how process isolation in LiMiT prevents other threads and processes from directly affecting event counts. The rdtsc instruction has no such capability. We then compute the average amount of time each operation takes using both rdtsc and LiMiT. We would expect the performance of each operation to degrade as resource sharing increases. There should be little or no performance degradation with 8 or fewer threads, mild degradation from 8 to 16 threads as SMT is utilized then a little more performance degradation above 16 threads as threads are swapped in and out. The data presented in FIG. 5(b) confirm these expectations when using LiMiT. rdtsc, however, incorrectly reports massive, linearly increasing performance degradation above 16 threads as a result of its lack of process isolation.

Case Studies

Based on three case studies with LiMiT using unsealed, production workloads we put forth several recommendations for architecture researchers.

In the first case study, we measure synchronization regions in production applications (Apache, MySQL and Firefox) as well as the PARSEC benchmark suite. The measurements show that Firefox and MySQL spend nearly a third of the execution time in synchronization which is 10× more than the synchronization time in PARSEC benchmarks. These results indicate that synchronization is used differently in production system applications than traditionally-studied scientific/numerical applications and architects must be aware of these differences. Performing similar measurements with PAPI-C show inflated synchronization times due to high measurement overheads, drastically changed cycle count ratios and increased instrumentation overheads from 42% to over 745%. Some workloads such as Firefox could not even run properly with PAPI-C because of the high overheads.

The next case study examines the interaction of programs with the Linux kernel via popular library calls. This interaction has not received much attention because of the difficulty in running modern, unsealed web workloads on full-system simulators. The investigation reveals that production applications spend a significant fraction of execution cycles in dynamically linked libraries and operating system calls.

Further, we find that routines in these two segments show distinctly different microarchitectural performance characteristics than userspace behavior.

The third and final case study demonstrates LiMiT's breadth of utility by conducting longitudinal studies of modern software evolution. By examining the evolution of locking behaviors over several versions of MySQL, we investigate if there has been a return on investment in parallelizing the software for multicores. This study illustrates how the utility of precise counting goes beyond traditional applications in architecture, compilers and OS, and that well-architected performance counting systems can have wide and deep impact on several computer science disciplines.

Case Study A: Locking in Web Workloads

Usage patterns of computers have changed drastically over the past decade. Modern computer users live in the cloud. These users spend most of the their time in web browsers—either on a traditional desktop or mobile device—which moves computation to backend servers. As a result, there are two separate and extremely important workloads in the web model: the frontend, consisting of web browsers and Javascript engines, and the backend, consisting of HTTP servers, script interpreters and database engines. Further, the workloads of these applications have also changed Often web pages rely far more on Javascript than ever before and database operations are no longer well modeled by traditional transactional benchmarks, often favoring scalability and speed over data security and transactional atomicity and durability.

We briefly characterize the synchronization behavior of several popular web technologies. Specifically, this study aims to answer the following questions: (1) Is synchronization a concern in web workloads and what are the locking usage patterns? (2) What future architecture directions can optimize web workloads? For comparison purposes, we also measure and analyze the PARSEC benchmark. As a numerical workload, PARSEC is likely representative of traditional (scientific computing) notions of parallel programming and may be different from web technologies.

Necessity of LiMiT—There are three features offered by LiMiT which enable this study: precise instrumentation, process isolation and low-overhead reads, not all of which are simultaneously offered by other technologies. Precision is necessary because we are capturing very short regions of executions—lock acquires/releases and critical sections—which are likely to be missed by sampling techniques. Process isolation (which is not offered by the traditional rdtsc) is required since we are operating in a multi-threaded environment with I/O, so processes are likely to be swapped in and out often. Finally, LiMiT's low-overhead counter readout routine is required to prevent large perturbation from skewing results. To further examine LiMiT's lowered overhead, we will compare results obtained with LiMiT to results obtained with PAPI.

Experimental Setup—To gain insight into modern web workloads, we examine the following software and input sets:

Firefox: A popular, open-source web browser, we ran Mozilla Firefox version 3.6.8. We visited and interacted with the top 15 most visited sites, as ranked by Alexa. Additionally, we used two web apps from Google, Gmail and Google Reader, two applications which rely heavily on AJAX, asynchronous Javascript and XML.

Apache: The Apache HTTP server is, according to Netcraft, the most popular HTTP sever with 56% market share as of August 2010. We evaluated the latest stable version, 2.2.16, using the included "ab" (Apache Benchmark) tool to fetch a simple static page. A total of 250 k requests were served with 256 requests being requested concurrently. Because we look only at static loads, the results will indicate a best-case scenario for Apache.

MySQL: MySQL is the traditional database server of choice for websites. The most recent stable version is MySQL 5.1.50 Community Server, which we evaluated. To exercise it's functionality, we ran the "sql-bench" benchmarking scripts included with MySQL's source code.

PARSEC: The PARSEC benchmark suite is a set of parallel applications largely targeting RMS workloads. We executed seven of the multithreaded benchmarks: blackscholes, swaptions, fluidanimate, yips, x264, canneal and streamcluster.

We instrumented each of these applications using LiMiT to track their critical sections and locking behaviors. Specifically, we collected information on the number of cycles spent acquiring and releasing locks, and time spent with locks held.

Figure 6:
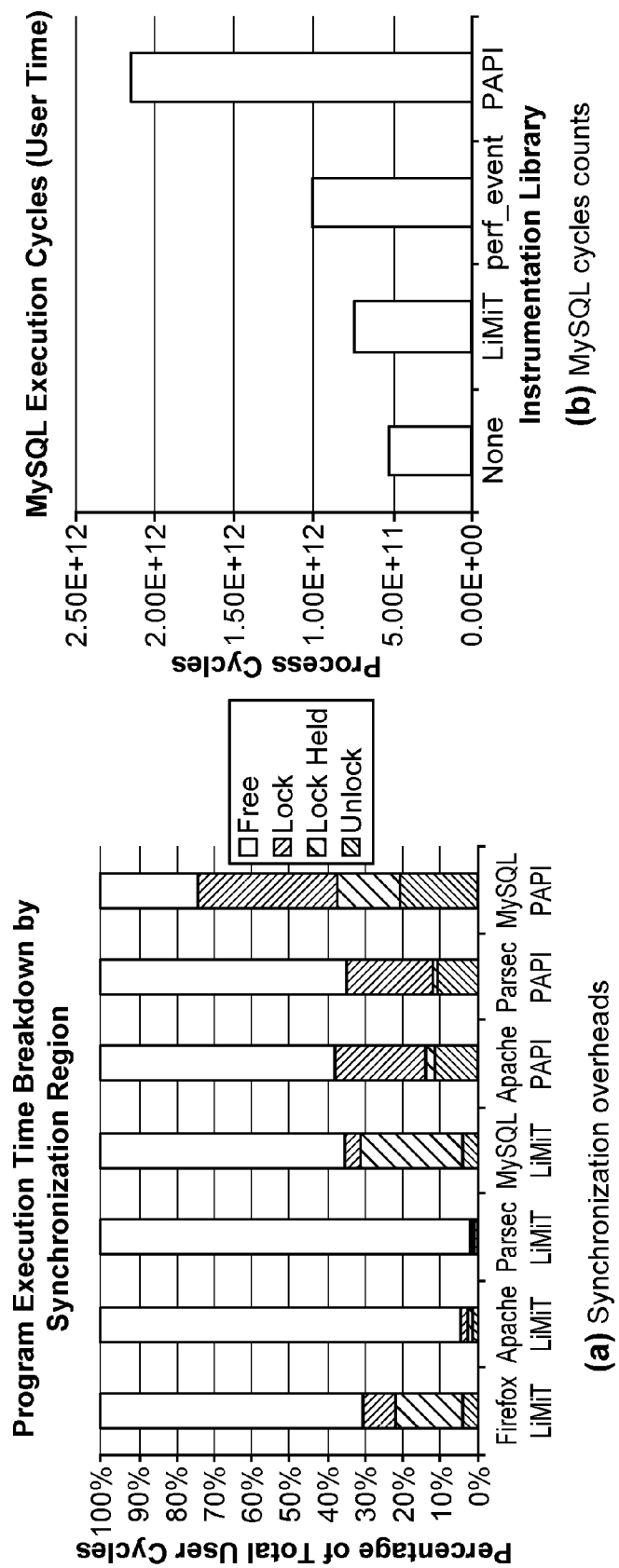
FIGS. 6(a) and 6(b) show a comparison of synchronization and critical section timing for various popular applications and the PARSEC benchmark suite along with execution times for MySQL.
Figure 7A:
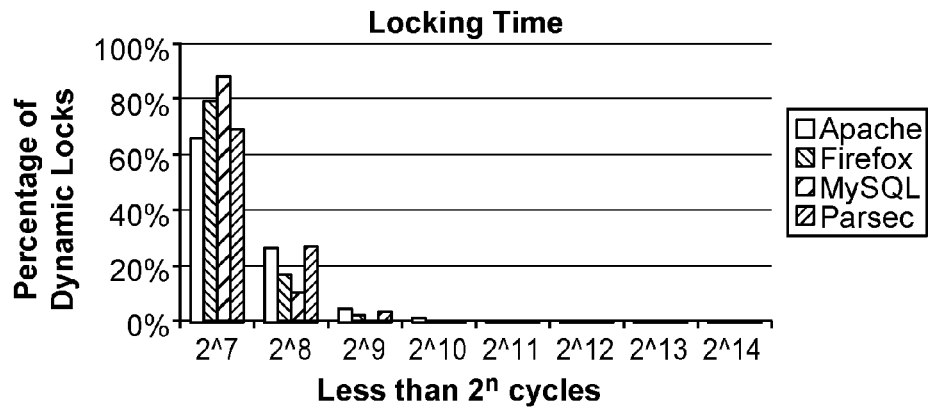
FIGS. 7A-F include a set of histograms of synchronization overheads and critical section times for several applications.
Figure 7B:
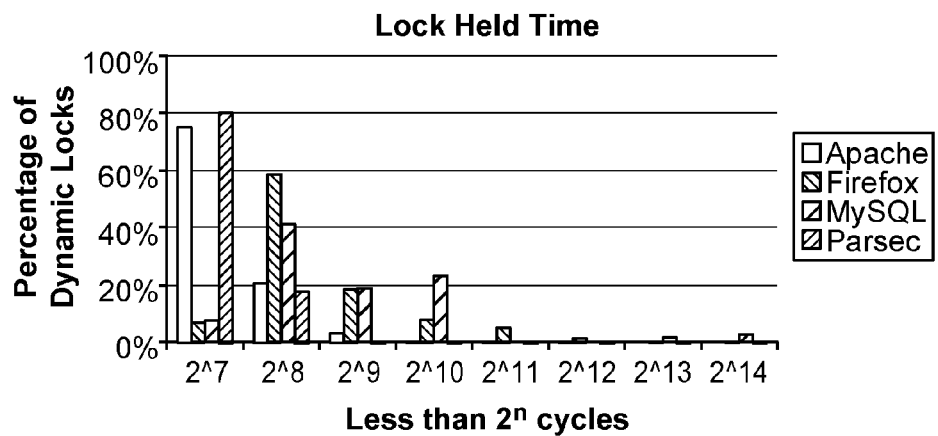
Figure 7C:
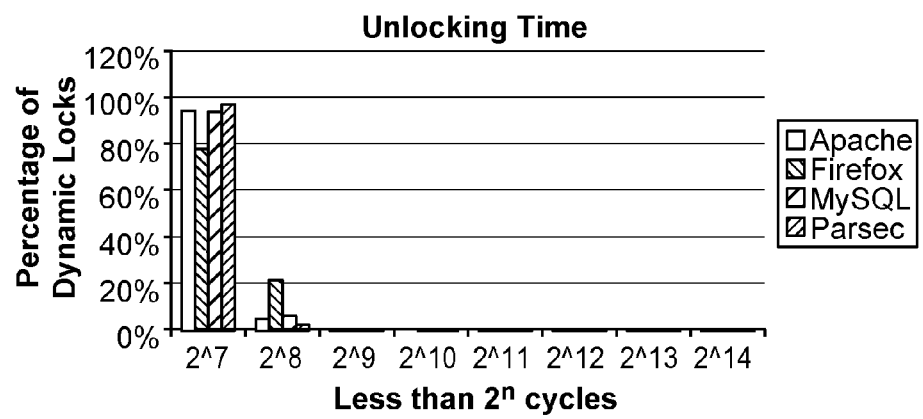
Figure 7D:
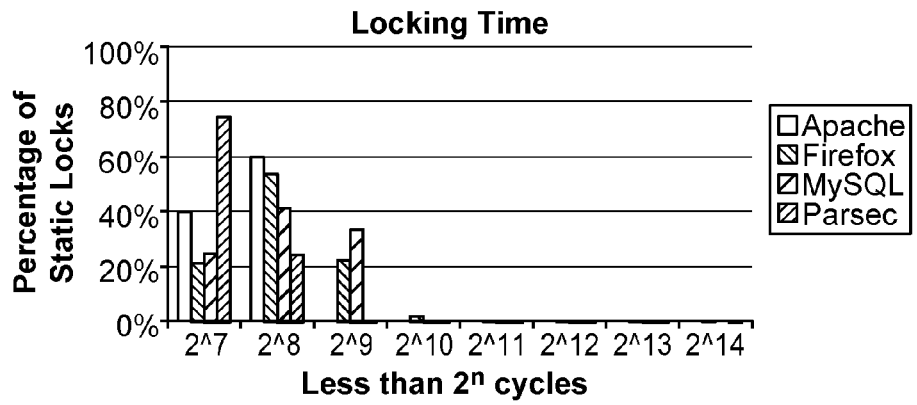
Figure 7E:
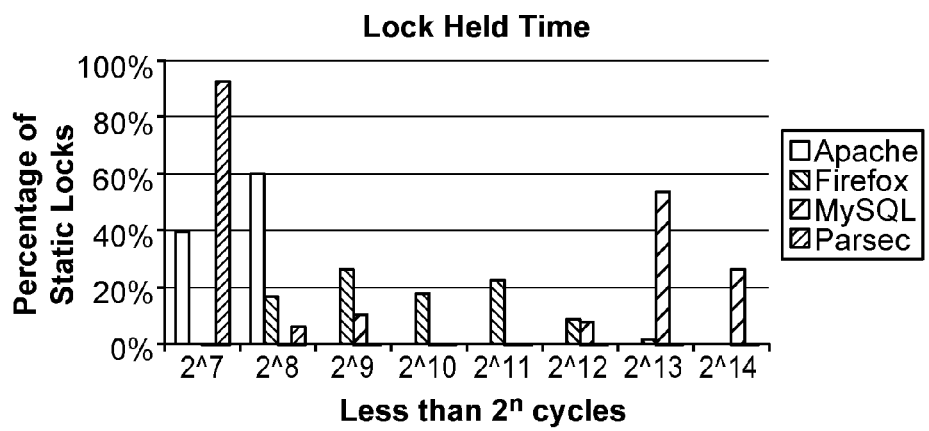
Figure 7F:
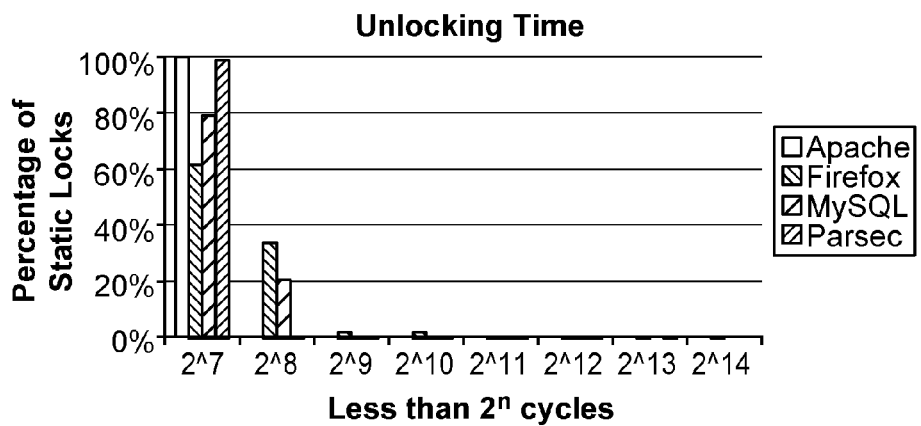

The charts in FIGS. 6 and 7A-F summarize the collected data. FIG. 6 shows an overview of synchronization overheads and critical section times. In particular, FIG. 6 presents a comparison of synchronization and critical section timing for various popular applications and the PARSEC benchmark suite along with execution times for MySQL. Results obtained with PAPI are inflated due to instrumentation overheads. We also see that PAPI instrumentation increases userspace cycle counts by more than 745% compared to LiMiT's 42% increase. We also note that Firefox (being an interactive program) could not execute with PAPI instrumentation. Execution time is computed as the total number of cycles in all threads, lock and unlocking times as all time spent in pthread_mutex_lock and pthread_mutex_unlock in all threads. Lock held time, however, is defined as summation of the amount of time each thread has at least one lock held; if more than one lock is held, time is not double-counted.

These data show that this behavior varies a great deal between the applications. FIGS. 7A-F contain histograms of locking and unlocking overheads (latency of lock acquire and release) and times spent in critical sections. We break down this data by both dynamic locks (number of lock acquires during execution) and static locks (number of lock instances observed during execution), revealing insights about lock usage patterns. We note that many critical section times are very short, comparable in cycle counts to lock acquisition times. From this data, we make several observations:

The histograms in FIGS. 7A-F indicate that the manner in which each application uses locks varies. PARSEC, for instance, holds locks for very short amounts of time, in stark contrast to MySQL and Firefox (see Table 2, provided in FIG. 13, which shows locking-related averages). This is likely because many of PARSEC's applications parallelize nicely, e.g., using data parallelism and static assignment. We note that the vast majority of PARSEC's static locks are observed in one benchmark fluidanimate. Without this benchmark, the number of static locks per thread per application drops to 0.575. These data indicate that scientific and web workloads have significant difference in synchronization behavior. The applications other than PARSEC, however, are interactive and must respond to events as they occur. Since this makes static assignment impossible, threads must interact more often, requiring more synchronization.

The previous point is further supported by the number of locks shown in Table 2. Highly interactive applications like Firefox and MySQL require significantly higher number of locks. PARSEC is likely able to use only barrier-like constructs to synchronize computation.

Based on this data, we will attempt to answer the questions set forth. To answer the first question, about locking patterns in web workloads, we observe that synchronization is a mixed bag in web applications. Some workloads, like Apache, are likely to be very parallel and scale easily. MySQL does not fit into this category as it does not scale as easily. Additionally, Firefox has far more synchronization overheads then one would expect. Based on personal experience with Mozilla code, we suspect this is a result of difficulties in parallelizing legacy "spaghetti" code which is likely to have many side effects which must be isolated from other threads.

Implications for Architects

The second question—How are architects affected by these results and what future directions would best support the web?—bears further analysis. There are several interesting points:

1. A new benchmark suite of web software may be necessary for new web-centric architecture research. SPEC has several versions of the "SPECweb" benchmark; future studies should include comparisons. However, many of the applications we have reviewed and other important cloud workloads are not part of SPECweb, including Firefox, Javascript, website supporting databases (nontransactional workloads), server caching and load balancing.

2. The data show locking overheads can be nontrivial compared to critical section times. Since locking/unlocking overheads can be 8% to 13% of overall cycles, speedups in this range may be possible with architectural/software techniques for streamlining lock acquisition. Further, we observe that the static lock distributions differ from the dynamic lock distributions, suggesting that one may be able to statically determine which locks are likely to be contended and which are likely to be held for many cycles.

3. Critical section times for MySQL are relatively large. In particular, over half of the lock instances have average lock hold times around 8,000 cycles (although they are locked less often). These represent segments of code which will not scale well. These regions are prime targets for microarchitectural optimization. If they can be sped up, parallel performance and scalability of MySQL will improve.

Case Study B: Kernel/Userspace Overheads in Runtime Library

The next case study is aimed at examining the interaction of programs with the Linux kernel via popular library calls and understanding their impact on program performance A prior study has shown that kernel calls can negatively impact performance by polluting branch predictors. Are there other on-chip structures that are affected by kernel calls? To what degree are modern applications affected by their kernel interaction? Is it possible to obtain fine-grained information about execution that can be tracked back to originating function calls? The goal is to use LiMiT to study common library functions' behaviors in both userspace and kernel space.

Necessity of LiMiT—There are two alternatives to using LiMiT for collecting this data.

First, simulation can be used to study the interaction of user and kernel code. Full system multiprocessor simulators can model the effect of system interaction and can shed light on effect of library calls but can be prohibitively slow without scaling workloads. Although LiMiT cannot achieve the accuracy and detail level of simulation, it can be used to rapidly gather precise information and coarsely locate problem regions.

The second option is sampling with external interrupts. This style of sampling provides an interrupt every N events at which point the sampling interrupt can analyze the application's execution state. In this study, however, we must determine which library functions use processor resources and the purpose of the function calls. For instance, we would like to know whether memcpy is manipulating program data or copying data for I/O. Obtaining this data in both user and kernel space is difficult for sampling-based methods as each sample interrupt must also run a stack trace (often from the kernel stack all the way back to and through the user stack) to identify the library entry point. We know of no existing sampling tool that is able to track kernel function usage back to the calling userspace function. While theoretically possible for sampling, LiMiT makes this approach downright easy. With LiMiT, we read counters at the entry and exit points of functions in each category, so all events occurring between the function entry and exit, including all functions called from within the function, are counted towards that function. For example, if pwrite calls memcpy internally or the kernel executes some locking functions during a read system call, any microarchitectural events resulting from the memcpy or kernel locking will count towards pwrite or read rather than memory or locking categories.

To examine the effects of kernel code, we intercept and instrument functions in libc and pthreads. During calls to these libraries, we count cycles, L3 cache misses and instruction cache stalls in user space and kernel space separately. After collecting data, we aggregate the data from each function into three separate categories: I/O, memory and pthreads. I/O contains functions such as read, write and printf whereas memory has functions like malloc and memset. Pthreads contains all of the commonly used synchronization functions. We look at two important systems applications, Apache and MySQL, using the workloads described above.

Figure 8A:
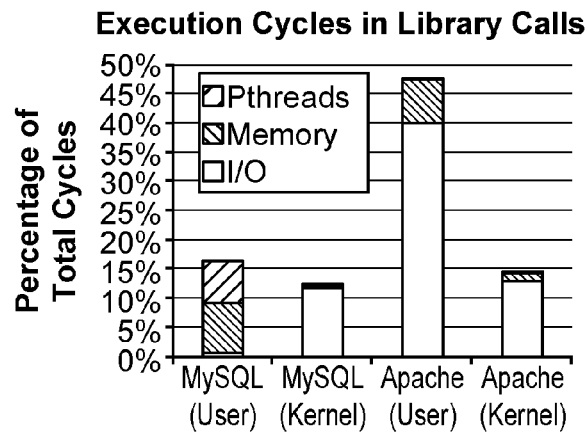
FIGS. 8(a), 8(b), and 8(c) show characteristics of various user space and kernel space microarchitectural events occurring in categories of library functions.
Figure 8B:
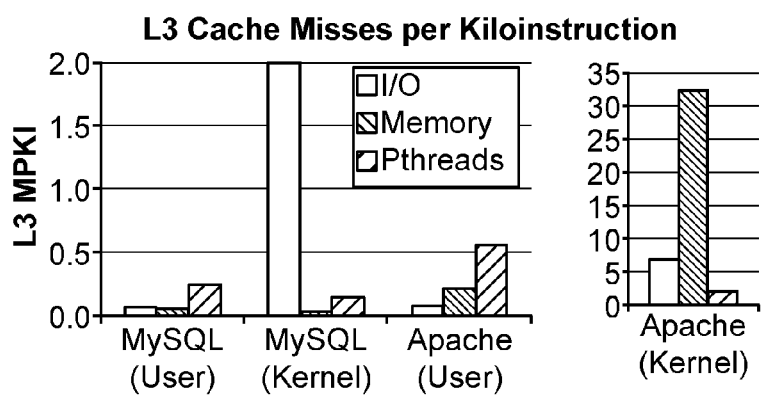
Figure 8C:
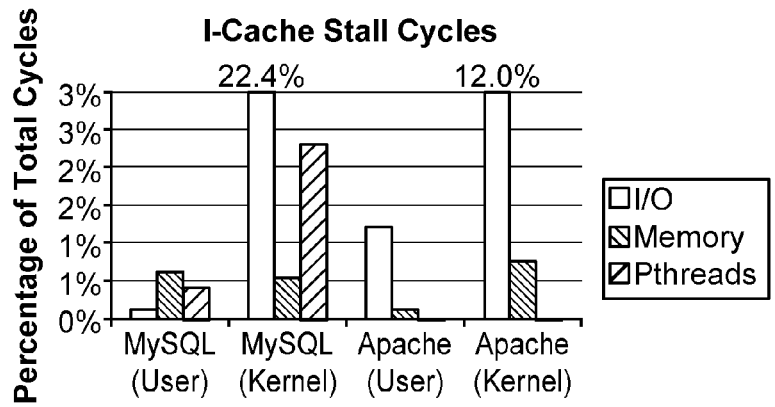
Figure 9:
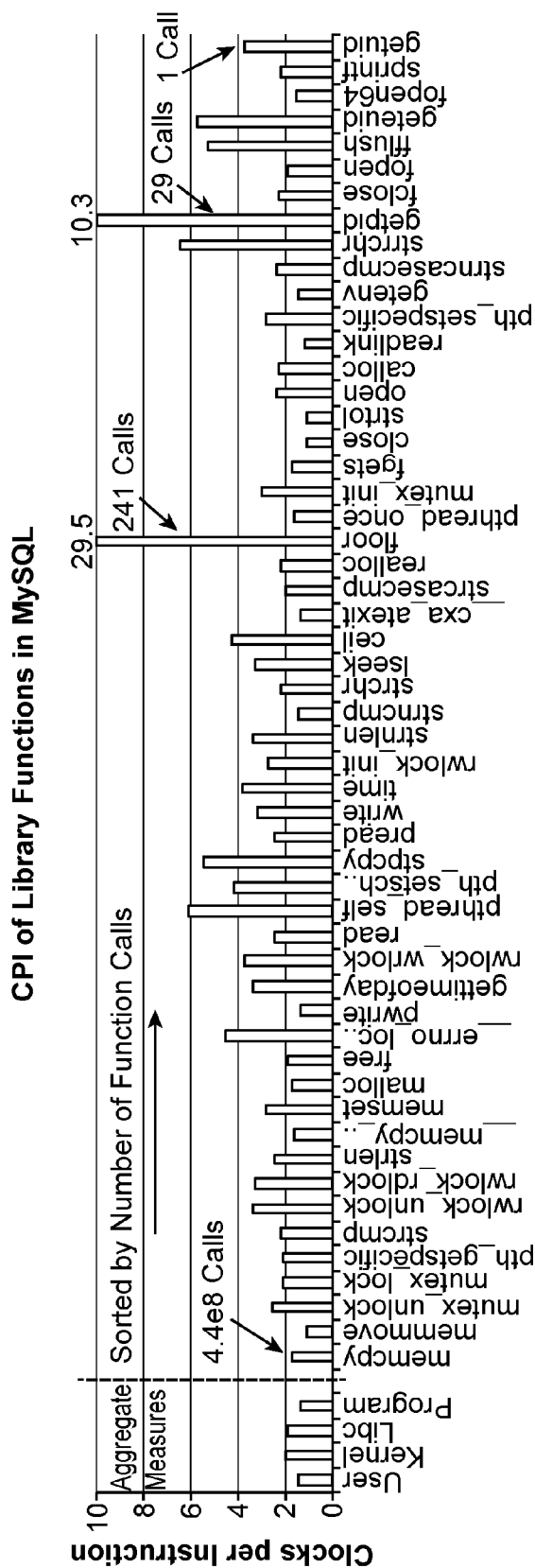
FIG. 9 shows cycles per instruction for various library functions executed by MySQL.
Figure 10:
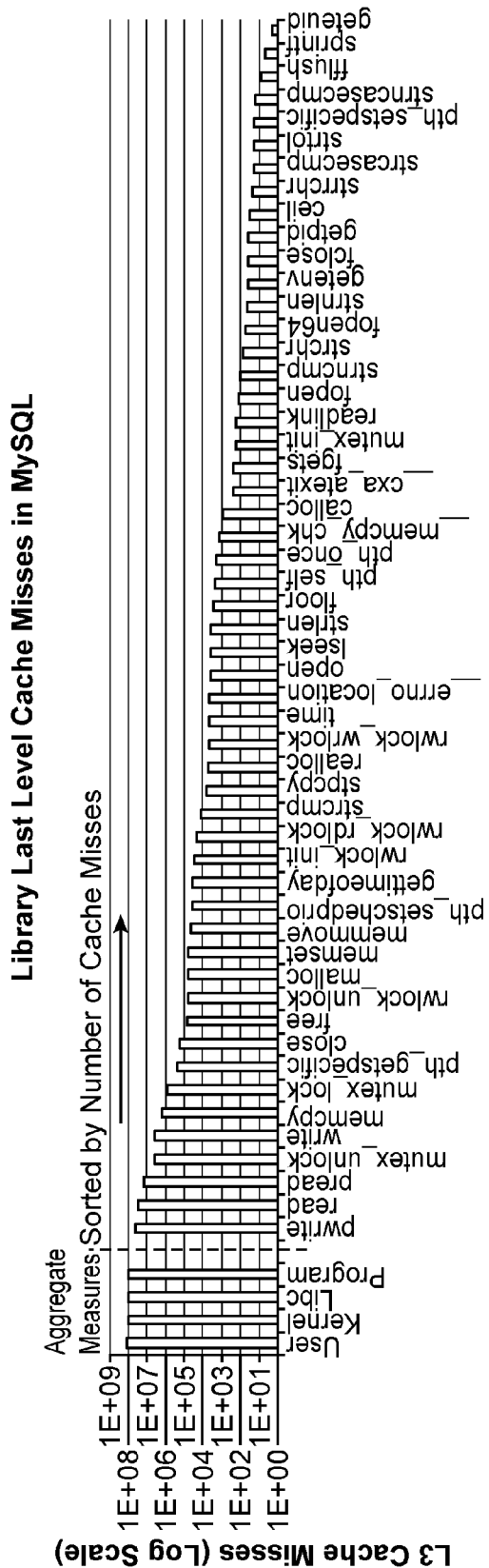
FIG. 10 shows L3 cache misses in various dynamically linked library functions.

The results of this study are shown in FIGS. 8-10. FIG. 8, which shows various user space and kernel space microarchitectural events occurring in categories of library functions, reveals potential inefficiencies. First, we observe that MySQL spends over 10% of its execution cycles in kernel I/O functions. Apache spends a comparable amount of time, but also spends a large amount of time in user I/O code. Overall, in fact, Apache spends the majority (about 61%) of its cycles in library code. Thus, comparing userspace to kernel, we see that kernel code behaves very differently than userspace code. Looking at cache information, FIG. 8(b) shows that kernel I/O experiences far more cache misses per kiloinstruction than userspace code (note the different scale for Apache in kernel space). The last chart, FIG. 8(c) helps explains further, revealing extremely poor instruction cache utilization in kernel mode, especially in I/O functions.

FIGS. 9 and 10 show the cycles per instruction (CPI) and last level cache misses for the worst performing functions in libc plus aggregates of userspace code, kernel code, library functions and normal program code (CIP for various library functions executed by MySQL are listed here, sorted by number of calls). We see that in many cases, code in the dynamically linked library performs worse than typical program code. The same is true of kernel code to an even greater extent. Although performance is particularly poor for functions like floor and getpid, they are not called often and thus do not affect overall speed. These data show that kernel code does not perform as well as userland code and that several functions perform very poorly, especially in terms of cache misses. In particular, the math function floor performs very poorly (due largely to cache misses) though it does not contain a kernel call. Fortunately, MySQL does not call it often (241 times compared with 4.4e8 times for memcpy). The infrequent calls and last level cache miss results suggest that that poor temporal locality and prefetching of mathematical constants or code in libm may be to blame for the poor performance.

As indicated in FIG. 10, L3 cache misses in various dynamically linked library functions show that a handful of library functions account for a large portion of all the cache misses. Many of these functions result in kernel calls which suffer from abnormally high cache miss rates, as seen in FIG. 8b. The MySQL benchmark executed for these data uses a database growing up to 45 MB in size, relative to 8 MB of CPU cache.

Implications for Architects

The first important result from this data is that system applications have a lot of kernel interaction and their behavior in kernel regions is markedly different from userspace. As a result, userspace-only simulation misses potentially important information. Additionally, there are two key observations in the above data which indicate potential avenues for optimization:

4. The Apache results show the importance of I/O optimization. Apache spends much time interacting with the kernel, incurring significant overheads. Hardware support to allow Apache (and similar programs) to circumvent the kernel to do its I/O could drastically decrease its latency and increase throughput.

5. Poor instruction cache behavior in kernel mode may indicate that the processor is unable to prefetch kernel instructions before interrupts occur. It should be possible for a hardware prefetcher to determine the system call number and prefetch the necessary upcoming instruction code, avoiding I-Cache misses.

6. Finally, this LiMiT-obtained data has identified several problem points in real applications with unsealed workloads. With LiMiT, a process that would have taken months using simulators took only 3 days. If micro-benchmarks can be designed to capture these bottlenecks, they can be used in full system simulation. This style of combining LiMiT's precise event counter approach with detailed simulation may be necessary for quantitative architecture research in the cloud era.

Case Study C: Longitudinal Study of Locking Behavior in MySQL

Embarking on parallelization is often a risky investment with little guarantee of performance improvements due to the difficulties in writing multithreaded code. Many organizations that have legacy sequential codes are hesitant to invest in parallelization without quantitative models that can be used to predict return of investment on parallelization. LiMiT offers capabilities to build such a model.

In this case study, we use LiMiT to examine the benefits of adapting software to multicores over multiple versions spanning years. To examine software development progress, we examine several versions of MySQL, an extremely popular database management system. Gartner Group estimates that 50% of IT organizations had MySQL deployments in 2008, making MySQL a very common workload. As an open source product, we are also able to access its source code from many versions going back to 2004. Releases from 2004 on are beneficiaries of increased market penetration of multicore machines, increasing pressure on MySQL to use multithreading for performance Goals—We will attempt to answer the following questions using behavioral information: (1) Has synchronization in MySQL changed through versions? (2) Has the amount of time in critical sections changed? We will use these questions to judge if MySQL developers have improved at multicore development since the widespread availability of multicore systems.

Necessity of LiMiT—As in case study A, we are examining fine-grained program sections: lock acquires/releases and critical sections. To avoid perturbation, interference from multiple threads and error introduced by sampling, we require LiMiT's low-overhead reads, process isolation and precision. Sampling is a poor option for the same reasons as given in case study A.

To answer these questions, we intercept mysqld calls to the pthread library's locking routines to insert timing instrumentation. All versions of MySQL were compiled and executed on identical systems, so they all use the same, recent version of pthreads. As input, we run the "sql-bench" benchmark suite supplied with MySQL.

Figure 11A:
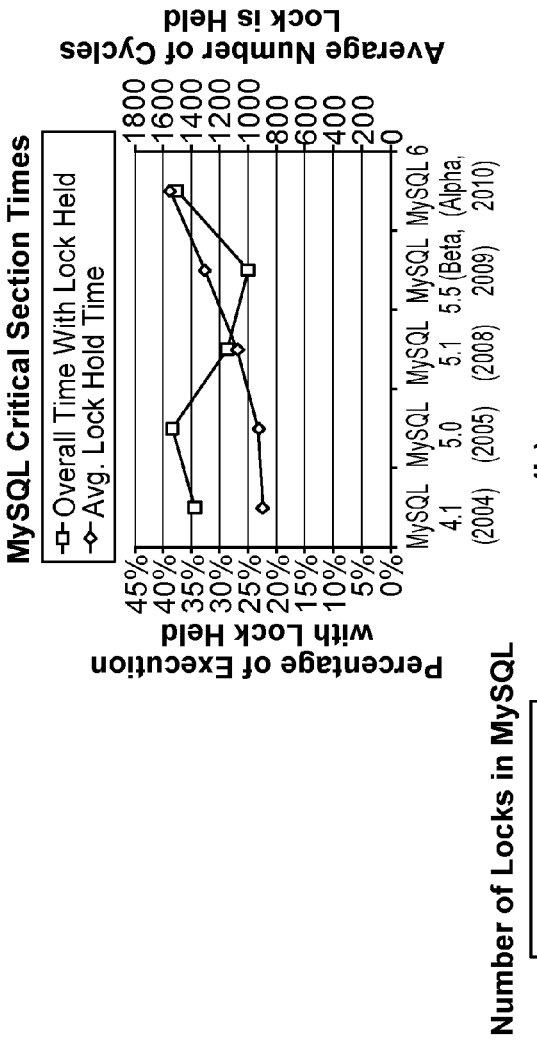
FIGS. 11(a), 11(b), and 11(c) show a history of synchronization in MySQL.
Figure 11B:
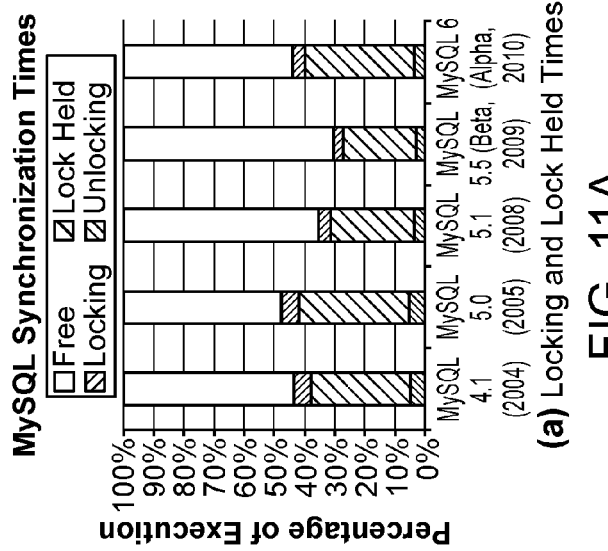
Figure 11C:
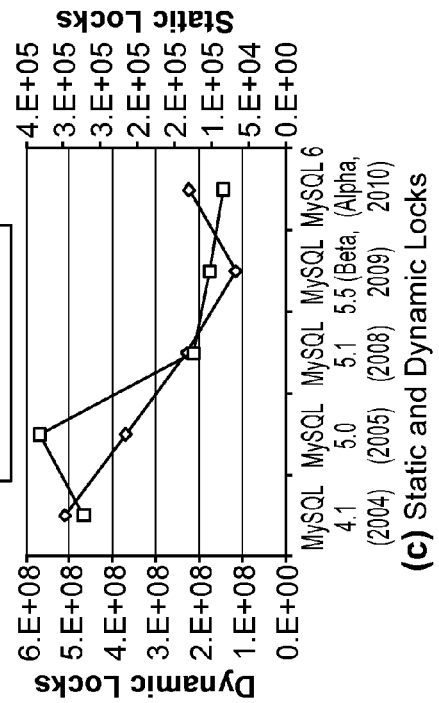

The results of this study are shown in FIG. 11, which shows a history of synchronization in MySQL. The results indicate that synchronization efficiency has increased since the 4.1 series, first introduced in 2004. FIG. 11(a) examines overall times in synchronization and critical sections. FIG. 11(b) rehashes the critical section results from the previous chart and overlays the average lock held time. Finally, FIG. 11(c) examines the number of static and dynamic locks observed during execution. There are several interesting points to note:

1. Average Lock Held Times: MySQL developers have decreased the total amount of time spent with locks held while simultaneously increasing the average amount of time each lock is held. This implies that the functionality of multiple critical sections has been combined. For low-contention critical sections, this increases overall efficiency by avoiding lock overheads.

2. Lock Granularity: The number of static and dynamic locks have both decreased. This implies that—on average—lock granularity has increased. Although this could increase contention, it has not come at that cost, so this granularity shift has likely been carefully tuned.

3. Alpha Version: MySQL 6, the alpha version, is an outlier with respect to recent versions. This is likely because it has not yet been optimized with respect to locking and new features have been implemented in overly conservative fashions.

To answer the initial questions, both synchronization overheads and critical section times have decreased over time. These performance improvements clearly show that developers have become more skilled, likely a result of multicore availability as parallel machines were not commonly available to hobbyist hackers before 2004.

Implication for Architects (#7): While this is primarily a software engineering/project management study—and the first study we know of to use precise performance counters for software engineering—there is a very important take away point here for computer architects: there is a potentially broader consumer base for on-chip performance counter data beyond computer architects, OS and compiler writers. Computer architects should take this into consideration when designing future hardware monitoring systems. Broadly, this means that monitors should be optimized not to capture just the common execution cases but also uncommon cases which are interest in domains such as software engineering and security.

Hardware Enhancements for Better Precise Performance Counting

We now describe modest hardware modifications, based on the experiences with LiMiT, that can increase the precision and utility of performance counters even further. Specifically, we describe: (1) a destructive performance counter read instruction for lower overheads; (2) 64-bit counters, and instructions that can read and write to the full 64 bits to avoid overflows; and (3) integration of counter selection into the read instruction. The combination of these three features would allow single instruction counter readouts and resets.

Precise performance measurement does not appear to be an intended application for performance counter architectures today. These modest modifications to existing performance monitoring hardware can reduce the complexity and overheads of precise counting with tools like LiMiT. The operations described below will reduce LiMiT's read routine from five instructions down to one and reduce the overhead of frequent counter usage patterns. Such low overheads would encourage programs to self-monitor and adapt to changing conditions.

Enhancement #1: 64-bit Reads and Writes—LiMiT's overflow handling is necessitated by a lack of full 64-bit read and write support. With 31-bit counters, the counters can overflow every 0.72 seconds, but with 64-bit support they would require centuries to overflow. Until such support can be added LiMiT will have a vital role in low overhead precise performance measurement.

Enhancement #2: Destructive Reads—When characterizing code segments, a difference in counts between two points in the program is often required. A destructive read instruction—one that zeros the counter after reading it—could eliminate the currently necessary subtraction in many cases when counters are used.

Enhancement #3: Combined Reads—Currently, the x86 performance counter read instruction requires that the % ecx register contain the number of the counter to read. Were this integrated into the instruction as an immediate, another instruction would be eliminated.

CONCLUSION

The disclosed embodiments include the following aspects: (1) We have described a lightweight, precise interface to performance counters on contemporary hardware. (2) We have conducted case studies to demonstrate the utility of precise monitoring to architects. Based on data collected with LiMiT, we offer new insights on program behavior which were not possible with existing tools. (3) Based on the experience with LiMiT, we describe hardware support to decrease the cost of accesses to performance counters.

To continue having real world impact, architects must be engineers, designing machines to accelerate a wide variety of new applications and usage models. As scientists, architects also need to conduct rigorous, reproducible research studies. While this latter goal can be achieved with simulation technology available today, it has been challenging for simulators to keep pace with rapid changes in the software landscape. Tools such as LiMiT help architects keep pace with new software, potentially using the insights gained to develop fast, robust, representative microbenchmarks for simulation based studies.

As a demonstration of the usefulness of precise performance monitoring capabilities offered by LiMiT, we conducted three case studies on current web workloads. These studies lead us to the following conclusions:

1. A new benchmark suite is recommended for research in computer architectures for the cloud era because traditional multithreaded benchmarks have different execution characteristics than multithreaded applications frequently used today.

2. Web applications tend to have many very short critical sections which could be sped up with architectural support for lighter weight synchronization. Since the total overhead of lock acquisition and release is about 13% and 8% for Firefox and MySQL respectively, speedups in that range may be possible.

3. Dynamically linked libraries and kernel code suffer from poor microarchitectural performance and also make up substantial portions of run time for system applications. Further research to enhance this performance could significantly accelerate web workloads.

4. Performance counters have far wider applicability than just computer architecture (e.g., software engineering) and architects designing performance counter systems should consider other applications.

These insights were made possible by precise, low-overhead performance monitoring capabilities provided by the LiMiT tool. These features allow monitoring of parallel programs more precisely than existing sampling based tools. In LiMiT we revisited and re-architected existing performance counter access methodologies (which had not been revised in the past decade). Specifically, we used novel kernel/user space cooperative techniques to allow user space readouts of performance counters. As a result, LiMiT is at least an order of magnitude faster than its existing state-of-the-art alternative, and reduces instrumented execution overheads significantly. In short, LiMiT can read virtualized counters in less than 12 nanoseconds, allowing precise measurements at finer granularities than have ever been studied.

Much of LiMiT's implementation complexity and execution cost was due to suboptimal hardware support. LiMiT can be further optimized with minimal additional hardware support. Specifically, we propose the following ISA changes for future architectures: [0145] (1) increasing the counter size to 64-bit and allowing full 64-bit reads and writes; (2) including a destructive read instruction; and (3) integrating counter selection into the read instruction. These three simple modifications would drastically reduce complexity and allow single instruction readouts.

Certain embodiments described above may include electronic hardware, software, or a combination of both. Software may be embodied on a computer-readable medium, such as a disk or memory, which may be non-transitory.

Other embodiments, extensions, and modifications of the ideas presented above are comprehended and should be within the reach of one versed in the art upon reviewing the present disclosure. Accordingly, the scope of the disclosed subject matter in its various aspects should not be limited by the examples presented above. The individual aspects of the disclosed subject matter, and the entirety of the disclosed subject matter should be regarded so as to allow for such design modifications and future developments within the scope of the present disclosure. The disclosed subject matter can be limited only by the claims that follow.

What is claimed is:

1. A method comprising:
    storing a value of a performance counter of a microprocessor in a first memory location in response to detection of a swap operation for a monitored process executed by the microprocessor; and
    upon detection of a swap back operation for the monitored process:
        setting the performance counter to a restored value determined based on whether the value stored in the first memory location exceeds a defined overflow threshold, and
        setting a counter output register, configured to hold content of the performance counter, to a zero value in response to a determination that at least one performance counter reading instruction, to read the content of the performance counter, was being executed during detection of the swap operation for the monitored process, and further in response to a determination that the value stored in the first memory location exceeds the defined overflow threshold.

2. The method of claim 1, wherein setting the performance value to the restored value determined based on whether the value stored in the first memory location exceeds the defined overflow threshold comprises one of:
    setting the performance counter to the stored value in the first memory location when the stored value in the first memory location does not exceed the defined overflow threshold; or
    setting the performance counter to a zero value and incrementing a second memory location, storing an accumulated overflowed value of the performance counter for the monitored process, by the stored value of the performance counter in the first memory location when the stored value of the performance counter in the first memory location exceeds the defined overflow threshold.

3. The method of claim 1, wherein the at least one performance counter reading instruction executed by the monitored process comprises:
    outputting the value of the performance counter to the counter output register;
    reading the accumulated overflowed value from the second memory location; and
    adding the accumulated overflowed value to the value of the performance counter.

4. The method of claim 3, wherein the at least one performance counter reading instruction executed by the monitored process further comprises storing, in another register, a parameter identifying a specific counter to be read.

5. The method of claim 3, wherein the instructions for outputting the value of the performance counter to the counter output register comprise an instruction including a parameter identifying a specific counter to be read.

6. The method of claim 1, wherein the defined overflow threshold is equal to $2^{N-1}$, where N is a maximum bit length which can be restored to the performance counter.

7. The method of claim 1, wherein the at least one performance counter reading instruction executed by the monitored process is detected by analyzing the instruction pointer register of the microprocessor.

8. The method of claim 1, wherein the performance counter measures micro-architectural events occurring in the microprocessor.

9. A system for performing precise microprocessor performance counter readings, the system comprising:
a microprocessor comprising one or more performance counters; and
memory storing an operating system for controlling the microprocessor, the operating system including a kernel, wherein the kernel is configured to perform operation comprising:
storing a value of a performance counter from the one or more performance counters of the microprocessor in a first memory location in response to detection of a swap operation for a monitored process executed by the microprocessor; and
upon detection of a swap back operation for the monitored process:
setting the performance counter to a restored value determined based on whether the value stored in the first memory location exceeds a defined overflow threshold, and
setting a counter output register, configured to hold content of the performance counter, to a zero value in response to a determination that at least one performance counter reading instruction, to read the content of the performance counter, was being executed during detection of the swap operation for the monitored process, and further in response to a determination that the value stored in the first memory location exceeds the defined overflow threshold.

10. The system of claim 9, wherein setting the performance value to the restored value determined based on whether the value stored in the first memory location exceeds the defined overflow threshold comprises one of:
setting the performance counter to the stored value in the first memory location when the stored value in the first memory location does not exceed the defined overflow threshold; or
setting the performance counter to a zero value and incrementing a second memory location, storing an accumulated overflowed value of the performance counter for the monitored process, by the stored value of the performance counter in the first memory location when the stored value of the performance counter in the first memory location exceeds the defined overflow threshold.

11. The system of claim 9, wherein the at least one performance counter reading instruction executed by the monitored process comprises:
outputting the value of the performance counter to the counter output register;
reading the accumulated overflowed value from the second memory location; and
adding the accumulated overflowed value to the value of the performance counter.

12. The system of claim 11, wherein the at least one performance counter reading instruction executed by the monitored process further comprises storing, in another register, a parameter identifying a specific counter to be read.

13. The system of claim 9, wherein the defined overflow threshold is equal to $2^{N-1}$, where N is a maximum bit length which can be restored to the performance counter.

14. A non-transitory computer readable media storing a set of instructions executable on a microprocessor that, when executed, causes operations comprising:
storing a value of a performance counter of the microprocessor in a first memory location in response to detection of a swap operation for a monitored process executed by the microprocessor; and
upon detection of a swap back operation for the monitored process:
setting the performance counter to a restored value determined based on whether the value stored in the first memory location exceeds a defined overflow threshold, and
setting a counter output register, configured to hold content of the performance counter, to a zero value in response to a determination that at least one performance counter reading instruction, to read the content of the performance counter, was being executed during detection of the swap operation for the monitored process, and further in response to a determination that the value stored in the first memory location exceeds the defined overflow threshold.

15. A method comprising:
loading an instruction pointer register with a value indicating a destructive performance counter read instruction;
obtaining a parameter from a first register of a microprocessor to select a performance counter of the microprocessor to read for the destructive performance counter read instruction;
reading content of the selected performance counter indicated by the parameter read from the first register, and loading the content read from the selected performance counter into at least a second register; and
setting the selected performance counter to a zero value.

16. The method of claim 15, wherein loading the content read from the selected performance counter into the at least the second register comprises loading a lower portion of counter value bits of the performance counter into at least the second register and loading an upper portion of the counter value bits of the performance counter into a third register.

17. A microprocessor configured to execute destructive performance counter reads, the microprocessor comprising:
a processing unit for executing instructions; and
memory, accessible by the processing unit, for storing the instructions that, when executed on the processing unit, cause operations comprising:
loading an instruction pointer register with a value indicating a destructive performance counter read instruction;
obtaining a parameter from a first register of the microprocessor to select a performance counter of the microprocessor to read for the destructive performance counter read instruction;

reading content of the selected performance counter indicated by the parameter read from the first register, and loading the content read from the selected performance counter into at least a second register; and setting the selected performance counter to a zero value.

18. The microprocessor of claim 17, wherein loading the content read from the selected performance counter into the at least the second register comprises loading a lower portion of counter value bits of the performance counter into at least the second register and loading an upper portion of the counter value bits of the performance counter into a third register.

19. A non-transitory computer readable media storing a set of instructions executable on a microprocessor that, when executed, causes operations comprising:

loading an instruction pointer register with a value indicating a destructive performance counter read instruction;

obtaining a parameter from a first register of the microprocessor to select a performance counter of the microprocessor to read for the destructive performance counter read instruction;

reading content of the selected performance counter indicated by the parameter read from the first register, and loading the content read from the selected performance counter into at least a second register; and setting the selected performance counter to a zero value.

20. The computer readable media of claim 19, wherein loading the content read from the selected performance counter into the at least the second register comprises loading a lower portion of counter value bits of the performance counter into at least the second register and loading an upper portion of the counter value bits of the performance counter into a third register.

* * * * *